United States Patent [19]

Narumi

[11] Patent Number: 4,927,235
[45] Date of Patent: May 22, 1990

[54] MOVABLE-MEMBER SUPPORTING APPARATUS

[75] Inventor: Ichiro Narumi, Saitama, Japan

[73] Assignee: Pioneer Electronic Corporation, Tokyo, Japan

[21] Appl. No.: 412,615

[22] Filed: Sep. 26, 1989

Related U.S. Application Data

[63] Continuation of Ser. No. 154,412, Feb. 10, 1988, abandoned.

[30] Foreign Application Priority Data

Feb. 10, 1987 [JP] Japan ................................. 62-28748

[51] Int. Cl.$^5$ .......................... G02B 7/04; G11B 7/00
[52] U.S. Cl. .................... 350/252; 350/255; 369/44.11; 369/44.21
[58] Field of Search .................. 350/247, 252, 255; 369/44, 45; 267/30, 103, 140.1, 140.5; 248/561, 562, 567, 576, 587

[56] References Cited

U.S. PATENT DOCUMENTS

| 4,574,369 | 3/1986 | Koide et al. ............................ 369/45 |
| 4,592,037 | 5/1986 | Ohnuki .................................. 369/44 |
| 4,596,448 | 6/1986 | Kikuchi ................................ 350/247 |
| 4,615,585 | 10/1986 | Van Sluys et al. . |
| 4,750,164 | 6/1988 | Nose ..................................... 350/255 |
| 4,773,062 | 9/1988 | Wada et al. ............................ 369/45 |
| 4,794,580 | 12/1988 | Ikedo et al. ......................... 350/252 |

FOREIGN PATENT DOCUMENTS

| 0053476 | 6/1987 | European Pat. Off. . |
| 0093669 | 11/1988 | European Pat. Off. . |
| 1262095 | 2/1968 | Fed. Rep. of Germany . |
| 3418409 | 11/1984 | Fed. Rep. of Germany . |
| 3510122 | 9/1985 | Fed. Rep. of Germany . |
| 1590628 | 5/1970 | France . |
| 497051 | 12/1938 | United Kingdom . |

Primary Examiner—Eugene R. LaRoche
Assistant Examiner—Martin Lerner
Attorney, Agent, or Firm—Sughrue, Mion, Zinn, Macpeak & Seas

[57] ABSTRACT

A movable-member supporting apparatus for supporting a movable member such as an optical pickup and suppressing vibration thereto. The movable-member supporting apparatus comprises a connecting portion for connecting a movable member to a fixed member, a flexible portion provided at an end portion of the connecting portion and arranged to be flexible in the longitudinal direction of the connecting portion and at least in one direction substantially perpendicular to the longitudinal direction, and a vibration-suppressing member attached to the flexible portion for suppressing vibrations of the flexible member.

5 Claims, 6 Drawing Sheets

MOVABLE-MEMBER SUPPORTING APPARATUS

This is a continuation of application Ser. No. 154,412, filed 2-10-88, now abandoned.

DETAILED DESCRIPTION OF THE INVENTION

BACKGROUND OF THE INVENTION

1. Field of the Invention

The present invention relates to a movable-member supporting apparatus which is suitable to support a movable member such as an optical pickup. In the movable-member supporting apparatus according to the present invention, a flexible portion which is bent in response to a motion of the movable-member is provided in the vicinity of a fixed end portion.

2. Background

FIG. 1 is a perspective view showing an optical pickup. In the drawing, an objective lens 1 is fixed to a cylindrical member 2 to converge light and irradiate a disk (not shown) with the converged light. The cylindrical member 2 is fixed to a bobbin 3. Focusing and tracking coils 4 and 5, respectively, are attached to an outer circumference of the bobbin 3. Those parts described above constitute a movable member. The movable member is provided with a supporting portion 6 which is supported by a supporting member (or suspension) 7 and connected to a fixed member 8 through the supporting member 7.

When a focusing or a tracking error signal is supplied to the coil 4 or 5, respectively, the coil 4 or 5. which is disposed in a magnetic field of a magnet (not shown), receives an electromagnetic force, so that the movable member moves in the focusing direction (FIG. 2(b)) or in the tracking direction (FIG. 2(a)), respectively. As a result, the focusing/tracking state of light impinging onto the disk through the objective lens 1 is controlled.

FIG. 4 shows the structure of the above-mentioned supporting member 7. In the drawing, a wire 11 is surrounded by a rubber material 12. Being flexible, the wire 11 can make the movable member move in the focusing/tracking direction. The rubber material 12 is provided to suppress unnecessary vibrations of the wire 11.

In the thus constituted supporting member, however, it is difficult to prevent (absorb) resonance of the supporting member in the axial (longitudinal) direction. As shown in FIG. 3. when resonance is generated in the supporting member 7 in the longitudinal direction (the direction A in FIG. 3) thereof, the movable member (which includes the bobbin 3 and the objective lens 1 supported by the bobbin 3) is rotated in the direction B in FIG. 3 within a plane parallel to the sheet of the drawing.

FIG. 5 shows the structure of a supporting member arranged so as to absorb the above-mentioned resonance in the longitudinal direction. The supporting member 7 has end portions 21 fixedly attached to a movable member and a fixed member, respectively, the end portions 21 being connected to each other through a connecting portion 22. The connecting portion 22 is formed of a pair of corrugated portions 23 and 24 formed in a corrugated shape and a pair of linear portions 25 and 26 formed in a substantially linear shape and disposed at a center between the corrugated portions 23 and 24. Each of the corrugated portions 23 and 24 connects the pair of end portions 21 to each other.

The linear portions 25 and 26 are connected at their one ends to the respective end portions 21 and extended from the latter, the other ends of the linear portions 25 and 26 overlapping each other at a substantially central portion between the end portions 21. The overlapped portion of the linear portions 25 and 26 are not connected with each other but are separated from each other.

The connecting portion 22 is bent in the direction substantially perpendicular to the sheet plane when the connecting portion 22 moves in the focusing direction, and bent in the direction substantially parallel to the sheet plane when the connecting portion 22 moves in the tracking direction, as viewed in FIG. 5.

On the other hand, for example, if the connecting portion 22 moves by $\Delta X$ in its longitudinal direction as shown in FIG. 7, the overlapped portions of the respective linear portions 25 and 26 are elongated (or shortened) correspondingly and the corrugated portions 23 and 24 are elastically transformed. A vibration-suppressing member 27 is attached at a position (a substantially longitudinal center of the connecting portion 22) where the linear portions 25 and 26 are overlapped on each other. As shown in FIG. 6, the vibration-suppressing member 27 is constituted by an absorbing member 31 made of a viscoelastic member (it suffices to apply only a viscoelastic agent), rubber, or the like, and a supporting member 32 made of aluminum foil, or the like, for supporting the absorbing member 31. Since the absorbing member 31 absorbs motion of the linear portions 25 and 26, the resonance in the longitudinal direction is prevented from being generated.

In the conventional movable-member supporting apparatus as shown in FIG. 5, resonance in the longitudinal direction can be prevented from occurring as described above, however, there is less vibration-suppressing effect against the displacement in the essential focusing/tracking direction. Accordingly, there is such a disadvantage that the Q factor (peak quantity) at a low-band resonant frequency becomes large to about 30 dB as shown in FIG. 8.

SUMMARY OF THE INVENTION

An object of the present invention is to provide a movable-member supporting apparatus in which not only the resonance in the longitudinal direction can be suppressed but the Q factor at a low band resonant frequency can be made small.

In order to attain the above object, the movable-member supporting apparatus according to the present invention comprises a first end portion fixed to a movable member, a second end portion fixed to a fixed member, a connection portion for connecting the first and second end portions with each other, a flexible portion provided at a portion of the connection portion in the vicinity of one of the first and second end portions and arranged so as to be flexible in the longitudinal direction of the connecting portion and at least in one direction substantially perpendicular to the longitudinal direction, and a vibration-suppressing member for suppressing vibrations of the flexible member.

The first and second end-portion are fixed to the movable and fixed member, respectively, and are connected through the connecting portion. The flexible portion is provided on the connecting portion in the vicinity of the first or second end portion. The flexible portion is arranged so as to be flexible in the longitudinal direction of the connecting portion and at least in the direction substantially perpendicular to the former.

DESCRIPTION OF THE PREFERRED EMBODIMENTS

Figure 1:
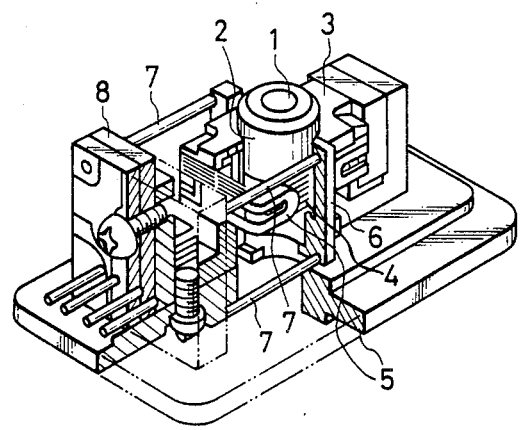
FIG. 1 is a perspective view showing a conventional movable-member supporting member.
Figure 2A:
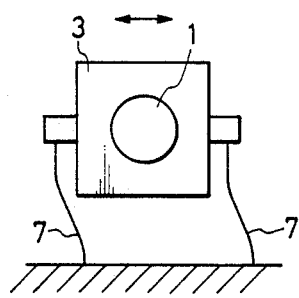
FIGS. 2 and 3 are views for explaining the displacement of the supporting member of FIG. 1.
Figure 2B:
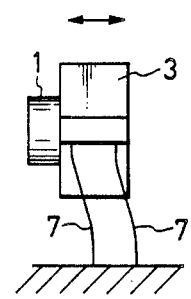
Figure 3A:
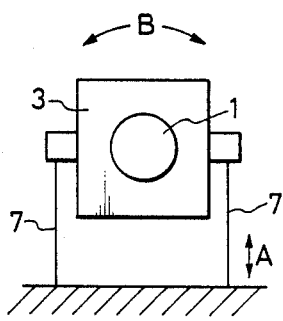
Figure 3B:
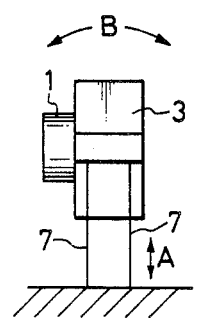
Figure 4:
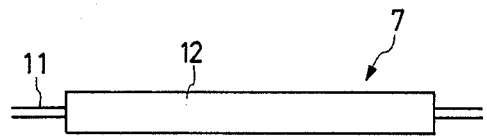
FIG. 4 is a view showing the arrangement of the supporting member of FIG. 1.
Figure 5:
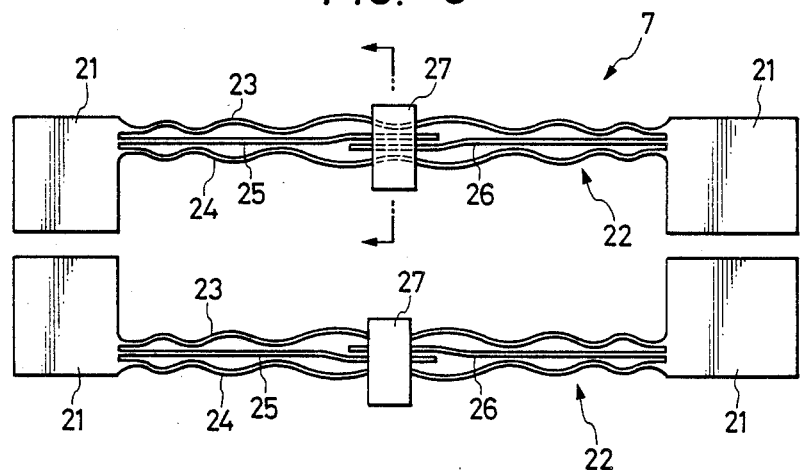
FIGS. 5 through 7 are views showing the arrangement of another example of the supporting member of FIG. 1.
Figure 6:
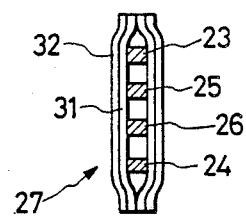
Figure 7A:
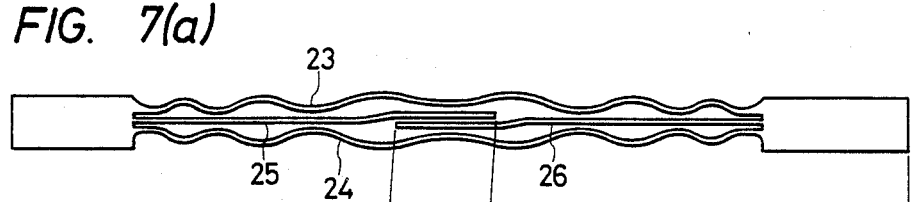
Figure 7B:
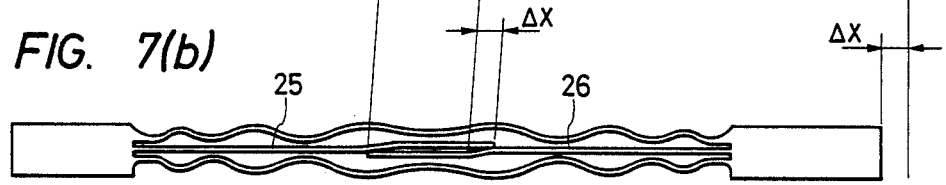
Figure 8:
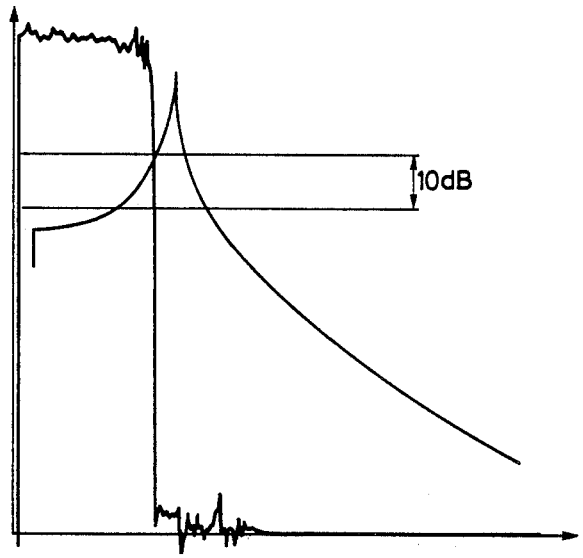
FIG. 8 is a diagram showing the characteristics of the supporting member shown in FIGS. 5 through 7.
Figure 9:
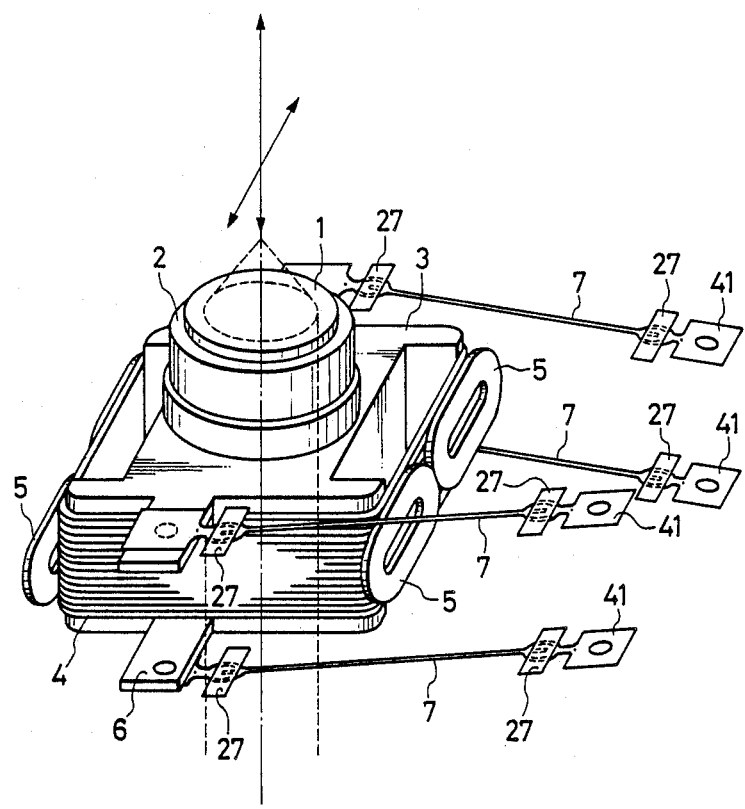
FIG. 9 is a perspective view showing the movable-member supporting apparatus according to the present invention.

FIG. 9 is a perspective view showing a movable-member supporting apparatus according to the present invention, applied to an optical pickup apparatus. In the drawing, parts corresponding to those in FIGS. 1 through 7 are correspondingly referenced and the detailed description about them is omitted.

Figure 10:
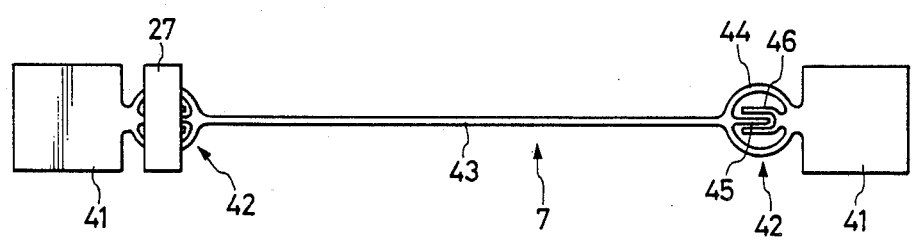
FIGS. 10 and 11 are views showing the arrangement of the supporting member of the movable-member supporting apparatus.

As shown in FIGS. 9 and 10, the supporting member 7, according to the present invention, comprises a pair of end portions 41 fixedly attached to a movable member and a fixed member, respectively, a linear connecting portion 43 for connecting the pair of end portions 41 with each other, and flexible portions 42 formed on the connecting portion 43 in the vicinity of the pair of end portions 41. The above described parts of the supporting member are formed integrally with each other by any suitable method, for example, by etching metal such as copper, stainless steel, or the like. Vibration-suppressing members 27 are attached to the flexible portions 42 (in the state illustrated in FIG. 10 only one vibration-suppressing portion is shown for convenience sake). The structure of each of the vibration-suppressing members is the same as that described in the above case.

Each of the flexible members 42 is provided with a substantially annular portion 44, a substantially U-shaped portion 46 disposed at a substantially center portion of the annular portion 44, and a linear portion 45 linearly disposed inside the U-shape portion 46. The linear portion 45 and the U-shape portion 46 are separated from each other.

Figure 11A:
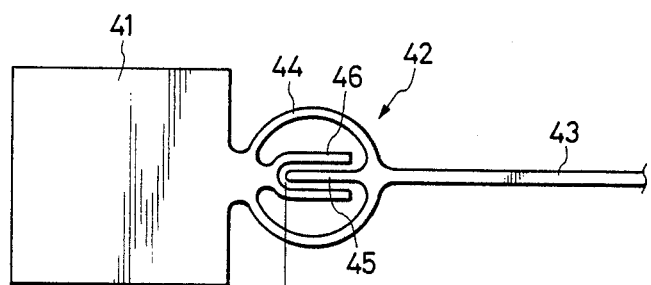
Figure 11B:
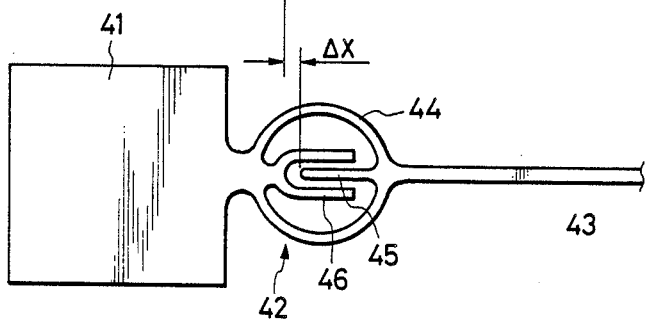

Assuming now that the supporting member 7 is displaced in its longitudinal direction, the state of the supporting member 7 changes from that shown in FIG. 11(a) into that shown in FIG. 11(b). That is, the annular portion 44 is elastically transformed into an elliptical shape, so that the linear portion 45 is displaced by a distance ΔX. At the time, the U-shaped portion 46 is not displaced.

Figure 11C:
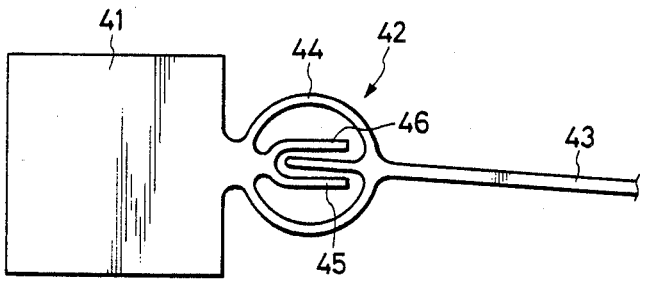

On the other hand, when the movable-member is moved in a tracking direction, the supporting member 7 is rotated within a plane substantially parallel to the surface of the sheet of the drawing, as shown in FIG. 11(c). Accordingly, the annular portion 44 is elongated at one side while contracted at the other side, so that the linear portion 45 is slanted inside the U-shaped portion 46.

Figure 11D:
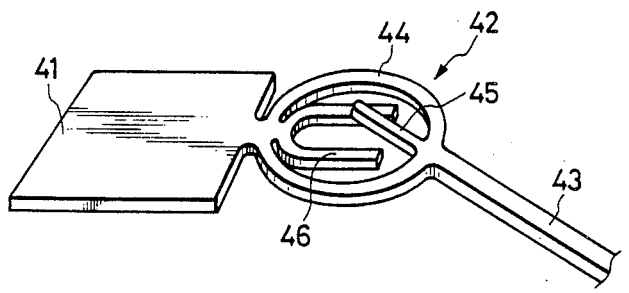

Upon occurrence of a motion in the focusing direction, on the other hand, the state of the supporting member 7 is as shown in FIG. 11(d). That is, the plane of the linear portion 45 becomes askew to the plane of the U-shaped portion 46, so that the linear portion 45 projects from the latter plane.

As described above, upon occurrence of a motion in any one of the three directions, displacement is caused correspondingly in the flexible member 42. Since the vibration-suppressing member 27 is attached to the flexible portion 42, the vibration in any direction can be suppressed.

Figure 12A:
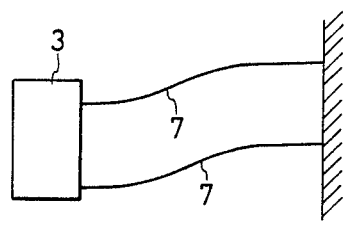
FIG. 12 is an explanatory view showing the displacement of the supporting member.
Figure 12B:
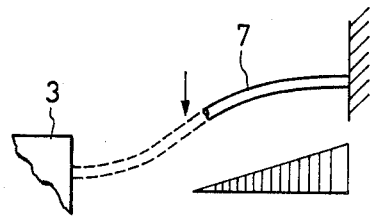
Figure 13:
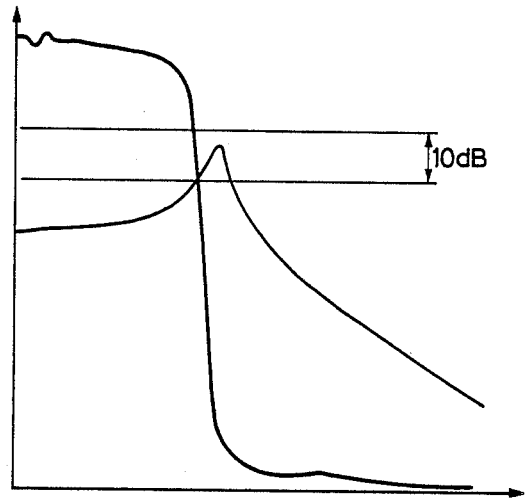
FIG. 13 is a diagram showing the characteristics of the supporting member.

The stress distribution when the supporting member 7 is displaced as shown in FIG. 12(a) becomes as shown in FIG. 12(b). The stress is maximum at the end portion of the supporting member attached to the movable member or the fixed member. As described above, since the flexible portion 42 is provided in the vicinity of the end portion, the displacement caused in each motion becomes maximum at the flexible portion. Accordingly, the quantity of transformation of the vibration-suppressing member 27 owing to the displacement of the flexible portion 42 becomes maximum, resulting in maximum vibration suppressing effect. As a result, as shown in FIG. 13, it is possible to make the Q factor (peak quantity) at a low-band resonance frequency $f_o$ small approximately 17 dB.

Figure 14:
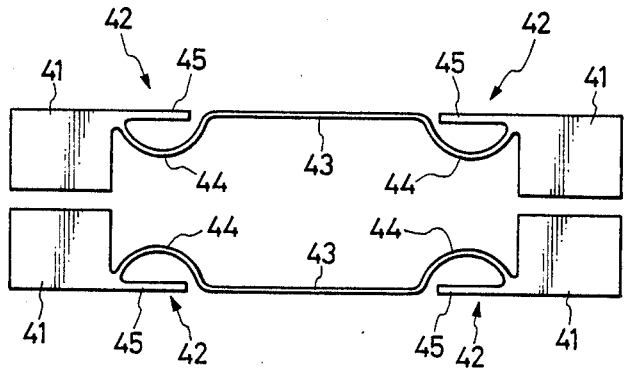
FIG. 14 is a view showing the arrangement of another embodiment of the supporting member.

FIG. 14 illustrates another embodiment of the supporting member 7 (vibration-suppressing member is not shown). In this embodiment, the flexible portion 42 is provided with a substantially semicircular curved portion 44, a linear portion 45 linearly projecting from a side portion of an end portion 41. In this arrangement, it is possible to obtain the same effect as that in the first embodiment.

As described above, the movable-member supporting apparatus according to the present invention, comprises a first end portion fixed to a movable member, a second end portion fixed to a fixed member, a connection portion for connecting the first and second end portions with each other, a flexible portion provided at a portion of the connection portion in the vicinity of one of the first and second end portions and arranged so as to be flexible in the longitudinal direction of the connecting portion and at least in one direction substantially perpendicular to the longitudinal direction, and a vibration-suppressing member for suppressing vibrations of the flexible member. Accordingly, resonance in the longitudinal direction can be suppressed and the Q factor at a low-band resonance frequency in a normal motion can be made small.

I claim:

1. A movable-member supporting apparatus, comprising: a first end portion fixed to a movable member; a second end portion adapted to be fixed to a fixed member; a connecting portion for connecting said first and second end portions to each other; a first flexible portion provided at a portion of said connecting portion in the vicinity of one of said first and second end portions and arranged so as to be independently flexible in the longitudinal direction of said connecting portion and at least in one direction substantially perpendicular to said longitudinal direction; and a first vibration-suppressing member attached to said first flexible portion for suppressing vibrations of said flexible member.

2. The movable-member supporting apparatus according to claim 1, further comprising a second flexible portion provided at a portion of said connecting portion in the vicinity of another of said first and second end portions and arranged so as to be flexible in the longitudinal direction of said connecting portion and at least in one direction substantially perpendicular to said longitudinal direction.

3. The movable-member supporting apparatus according to claim 2, further comprising a second vibration-suppressing member attached to said second flexible portion for suppressing vibration of said second flexible member.

4. The movable-member supporting apparatus according to claim 1, wherein said first flexible portion comprises: a substantially annular portion, a substantially U-shaped portion disposed at a center portion of said annular portion and connected to one side thereof, and a linear portion linearly disposed inside and connected to another side of said annular portion.

5. The movable-member supporting apparatus according to claim 1, wherein said first flexible portion comprises a substantially semicircular curved portion connected at one end to one of said first and second end portions, and a linear portion linearly projecting from a side portion of said one of said first and second end portions.

* * * * *